United States Patent
Zhang et al.

(10) Patent No.: US 11,062,572 B1
(45) Date of Patent: Jul. 13, 2021

(54) VISUAL INDICATOR FOR HEAD-MOUNTED DEVICE

(71) Applicant: AMAZON TECHNOLOGIES, INC., Seattle, WA (US)

(72) Inventors: Han Zhang, Mountain View, CA (US); Oliver Huy Doan, San Francisco, CA (US); Nikhil Gautam, Santa Clara, CA (US); Yana Potashnik, Palo Alto, CA (US); Alfred Ying-Fai Lui, San Jose, CA (US); Jeffrey John Easter, San Francisco, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/710,363

(22) Filed: Sep. 20, 2017

(51) Int. Cl.
| | |
|---|---|
| G08B 7/00 | (2006.01) |
| G08B 5/36 | (2006.01) |
| G08B 21/18 | (2006.01) |
| G06F 1/16 | (2006.01) |
| G02B 5/02 | (2006.01) |
| H05B 45/10 | (2020.01) |
| H05B 45/20 | (2020.01) |

(52) U.S. Cl.
CPC ............ *G08B 5/36* (2013.01); *G06F 1/163* (2013.01); *G08B 21/18* (2013.01); *G02B 5/0278* (2013.01); *G06F 1/169* (2013.01); *G06F 1/1686* (2013.01); *G06F 1/1694* (2013.01); *G06F 1/1698* (2013.01); *H05B 45/10* (2020.01); *H05B 45/20* (2020.01)

(58) Field of Classification Search
None
See application file for complete search history.

(56) References Cited

U.S. PATENT DOCUMENTS

| | | | |
|---|---|---|---|
| 10,012,506 B1 * | 7/2018 | Monahan | G02C 11/10 |
| 2002/0186180 A1 * | 12/2002 | Duda | A42B 1/245 345/8 |
| 2003/0163827 A1 * | 8/2003 | Purpura | A42B 3/042 725/105 |

(Continued)

OTHER PUBLICATIONS

"OPT3006 Ultra-Thin Ambient Light Sensor", Texas Instruments Inc., SBOS698, Oct. 2016, 43 pages. Retrieved from the Internet: <URL:http://www.ti.com/lit/ds/symlink/opt3006.pdf>.

(Continued)

*Primary Examiner* — Julie B Lieu
(74) *Attorney, Agent, or Firm* — Lindauer Law, PLLC

(57) ABSTRACT

A head-mounted wearable device (HMWD) incorporates a visual indicator device (VID) that provides a visual cue to a wearer about activity of the HMWD. The VID may be positioned in a frame of the HMWD to be within an upper portion of a wearer's field of view during wear. The VID may provide a diffuse illumination that is visible to the wearer but does not obtrusively illuminate the face of the wearer, resulting in the visual indicator being unobtrusive to bystanders. Activation, intensity, color, blink rate, or other characteristics of the visual indicator may be used to provide the wearer with information. For example, the VID may illuminate with a solid color while a microphone on the HMWD is active, or blink while the microphone is muted. Input from an ambient light sensor may be used to adjust the operation of the VID during operation.

21 Claims, 8 Drawing Sheets

(56) References Cited

U.S. PATENT DOCUMENTS

| | | | | |
|---|---|---|---|---|
| 2005/0099799 A1* | 5/2005 | Cugini | ............... | F21L 14/00 |
| | | | | 362/105 |
| 2016/0066847 A1* | 3/2016 | Sales | ............... | A61B 5/1114 |
| | | | | 600/324 |
| 2016/0151603 A1* | 6/2016 | Shouldice | ............... | H04R 3/00 |
| | | | | 600/28 |
| 2016/0256086 A1* | 9/2016 | Byrd | ............... | A61B 5/0059 |
| 2017/0039336 A1* | 2/2017 | Bitran | ............... | A61B 5/6801 |
| 2017/0265798 A1* | 9/2017 | Sales | ............... | A61B 5/18 |
| 2017/0337857 A1* | 11/2017 | Tiberi | ............... | G02C 7/101 |
| 2017/0364153 A1* | 12/2017 | Kazansky | ............... | G06F 3/015 |
| 2018/0152781 A1* | 5/2018 | Boyer | ............... | H03G 3/02 |
| 2019/0251354 A1* | 8/2019 | Cork | ............... | A61B 1/00055 |

OTHER PUBLICATIONS

"Taking Snaps", Snap Inc., Spectacles Support, 3 pages. Retrieved from the Internet: <URL:https://support.spectacles.com/en-US/article/specs-snaps>.

"Ultra-Low Lux, Low Power, Integrated Digital Ambient Light Sensor with Interrupt Function ISL29033", Intersil, LLC, Datasheet FN7656.5, Sep. 28, 2016, 15 pages. Retrieved from the Internet: <URL:http://www.intersil.com/content/dam/Intersil/documents/isl2/isl29033.pdf>.

* cited by examiner

VISUAL INDICATOR FOR HEAD-MOUNTED DEVICE

BACKGROUND

Wearable devices provide many benefits to users, allowing easier and more convenient access to information and services. Wearable devices may provide output that is audible to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
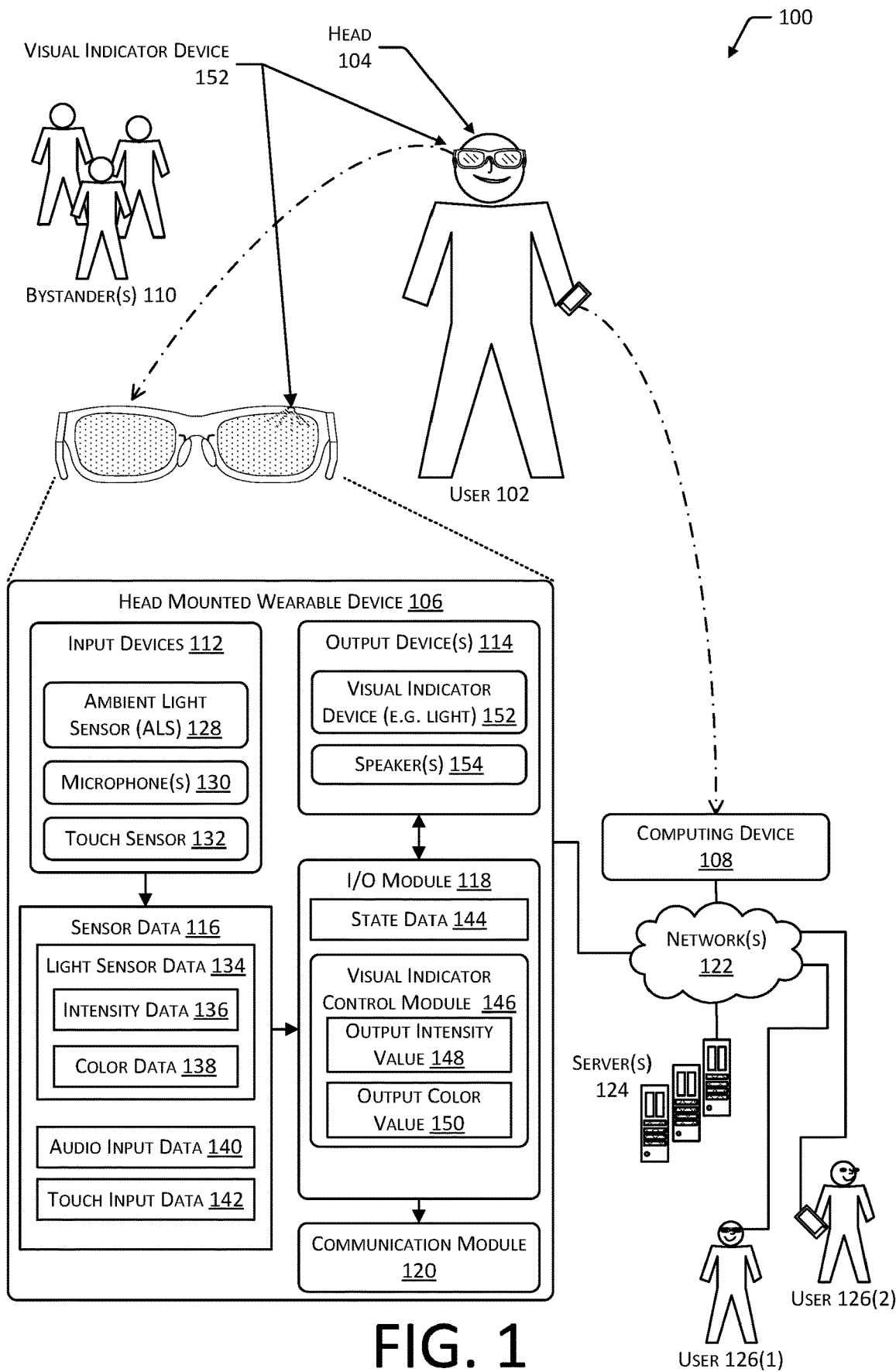
FIG. 1 depicts a system including a head-mounted wearable device equipped with a visual indicator device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information.

Described in this disclosure are devices and techniques that utilize a visual indicator device, such as a light, to provide information visually to a user who is wearing the HMWD.

The HMWD may operate independently as a standalone device, or may operate in conjunction with another computing device. For example, the HMWD may operate in conjunction with a smart phone, tablet, network service operating on servers, and so forth. The HMWD includes input devices and output devices that provide a user interface to the user. In one implementation, the HMWD may use the computing device to provide access to a wide area network, computer resources, data storage, a display for image output, and so forth.

Among the input devices, the HMWD may include one or more microphones, such as an air conduction microphone (ACM) that detects sounds transferred by air or a bone conduction microphone (BCM) that detects sounds transferred by another medium such as the head of the user, and so forth. The HMWD may also include an ambient light sensor (ALS). The ALS may produce light sensor data, such as intensity data, color data, and so forth that provides information about the ambient light at the HMWD.

Among the output devices, the HMWD may include a visual indicator device. Other output devices may also be present, such as one or more of a bone conduction speaker (BCS) or air conduction speaker (ACS). These provide sound that may be audible to the user during operation.

The visual indicator device is capable of producing a visual signal that may be perceptible to the user who is wearing the HMWD. The visual signal may be presented along a portion of an interior of a front frame of the HMWD that is positioned in front of the user's face during normal wear. For example, the visual indicator device may comprise a light emitting diode (LED) that emits light from an opening of an inner cover of the front frame. The opening may be positioned in an upper portion of the frame and to one side. For example, the opening may be in an upper right portion of the inner cover of the front frame. During normal wear of the HMWD, the frame of the HMWD is within the user's field of view.

To improve visibility to the user, the visual indicator device may utilize a device that either emits light from an area of a minimum size, or may utilize a diffuser element to disperse light to a desired area. For example, the user may have difficultly perceiving or may not prefer a pinpoint of bright light in their field of view produced by a very small LED. A diffuser element may be used to disperse the light from the LED to a larger area. For example, the diffuser element may be approximately 1 mm tall by 3 mm wide. In another implementation the light emitting device, such as an LED or electroluminescent panel, may have an area of a desired size, such as 1 mm by 3 mm, and the diffuser may be omitted.

The visual indicator device may comprise other emissive devices, such as the LED mentioned above, electroluminescent devices, fluorescent devices, quantum dots, lasers, and so forth. In other implementations reflective devices that utilize ambient light may be used. For example, the visual indicator device may comprise a liquid crystal element, an electrophoretic element, and so forth that are able to present a change in color, contrast, pattern, and so forth. Continuing the example, the visual indicator device may comprise a liquid crystal section that is able to transition from light gray to dark gray.

The HMWD may utilize the visual indicator device to present information to the user. This information may be based on state data about operation of one or more devices of the HMWD being indicative of a specified condition at a particular time. For example, the state data may indicate that the microphone is active. The system may be configured such that when the specified condition of "microphone active" is determined, the visual indicator device illuminates. The state data may also be indicative of a state of an application. For example, the state data may indicate that there is an incoming message.

In addition to the use of the state data being indicative of a specified condition, operation of the visual indicator device may be controlled at least in part by other information. For example, the ambient light sensor may produce light sensor data that is indicative of one or more of intensity data indicative of intensity of the ambient light, color data indicative of the color of the ambient light, and so forth. The intensity of the light emitted by the visual indicator device may be responsive to the intensity of the ambient light. For example, when the HMWD is in bright sunlight the visual indicator device may be brighter than when the HMWD is in a dark room.

The intensity of the illumination provided by the visual indicator device when active may be configured to be minimally obtrusive to bystanders. For example, if the intensity of illumination provided by the visual indicator device is too great, it may noticeably illuminate or "highlight" part of the user's face. This could be distracting or annoying to bystanders, or provide bystanders with information about the state of the HMWD that the user may not wish to share.

In one implementation, the illumination produced by the visual indicator device may be deemed unobtrusive when the illuminance of an area on the face of the user as produced by the visual indicator device is within a threshold value of the illuminance provided by ambient light. For example, if the ambient light provides 100 lumens per square meter of illumination the visual indicator device may be configured to provide less than 100 lumens per square meter of illumination.

The intensity of illumination produced by the visual indicator device may be adjusted, responsive to the light sensor data, to provide illumination that is visible to the user but does not produce obtrusive illumination. For example, a lookup table may associate particular light intensity values from the ALS with particular output intensity values. By using the lookup table, the output intensity value may be determined and used to control the intensity of illumination produced by the visual indicator device.

The color of the illumination produced by the visual indicator device may be adjusted responsive to various data. For example, based on location data and time of day, the color temperature of the illumination produced by the visual indicator device may be adjusted to approximate the color changes associated with changes in daylight. Continuing the example, during the day, the color of the illumination may exhibit a color temperature of 5700 Kelvin (K) while illumination during the evening may have a color temperature of 2700 K.

In another example, the color of the illumination produced by the visual indicator device may be changed based on color data provided by the ALS. For example, if the ALS determines the ambient lighting has a color temperature of 3300 K, the visual indicator device may be operated to produce illumination that is substantially the same. By matching the color of the ambient light, the illumination produced by the visual light indicator may be rendered less obtrusive to bystanders. For example, if the user is sitting at a candlelight table and the visual indicator device activates to produce bluish light, bystanders may notice this. In comparison, by adapting the output color of the visual indicator device responsive to the light in the environment, the HMWD may in this example produce a visual indication that is less noticeable.

The visual indicator device may emit different colors of light to present information representative of state data. For example, if the state data indicates an incoming realtime communication that is flagged as "emergency", the color of the light from the visual indicator device may be set to red with maximum intensity. In another example, microphone activation may result in illumination using a color that is adjusted based on ambient light color, while camera activation may be blue.

The visual indicator device may utilize different illumination patterns to convey information. The illumination pattern may specify how the visual indicator device produces visual indicia over time. For example, the visual indicator device may use a first illumination pattern that produces steady illumination to indicate the microphone is active, while a second illumination pattern produces blinking to indicate that the microphone is active but muted.

In some implementations multiple visual indicator devices may be present on the HMWD at different positions. For example, a first visual indicator device may emit light from a first opening in an upper left portion of the inner cover, while a second visual indicator device may emit light from a second opening in an upper right portion of the inner cover. A third visual indicator device may be located at a third opening in a lower right portion of the inner cover. The visual indicator devices located at different positions may differ from one another. For example, the first visual indicator device may comprise an LED while the third visual indicator device may comprise a liquid crystal element.

Various combinations of color, illumination pattern, position, and so forth may be used individually or in combination to present information. For example, activation of a microphone may illuminate the first visual indicator device while activation of a touch sensor may illuminate the second visual indicator device. Operation of the visual indicator device may change based on whether the HMWD is being worn. For example, the intensity of the light from the visual indicator device may be increased when the HMWD is not being worn.

The techniques described above with regard to operating the visual indicator device may be combined. For example, the output of the visual indicator device may be controlled based on the intensity and color of the ambient light as determined by the ALS, responsive to the state data, and so forth.

Operation of the visual indicator device may also be combined with operation of other output devices. For example, an audible prompt may be emitted from the speaker contemporaneously with the activation of the visual indicator device.

By utilizing the devices and techniques described, information may be presented to the user of the HMWD in a way that is more discrete and less obtrusive. Privacy of the user is also improved by reducing the likelihood of a bystander seeing the visual signal. The visual indicator device also provides a more cost-effective way to provide visual output to a user of a HMWD. Compared to display technologies, the visual indicator device may use less electrical power, reducing power consumption and improving operating time for a given amount of battery power.

Safety of the user and bystanders may be improved because the operation of the visual indicator device may be recognized by the user without the need for the user to change their direction of gaze or utilizing central vision. For example, while the user is looking around while walking, the visual indicator device produces a visual signal that does not impede the user's vision.

Illustrative System

FIG. 1 depicts a system 100 in which a user 102 is wearing on their head 104 a head-mounted wearable device (HMWD) 106 in a general form factor of eyeglasses. The HMWD 106 may incorporate hinges to allow the temples of the eyeglasses to fold. The HMWD 106 may include one or more lenses. The lenses may be shaped to provide a particular refractive effect on light rays, such as in the case of prescription lenses.

The HMWD 106 may be in communication with one or more affiliated computing devices 108. For example, the HMWD 106 may communicate with the computing device 108 using a personal area network (PAN) such as Bluetooth. The computing device 108 may be used at least in part to provide additional resources, such as access to the network, compute resources, storage, display output, and so forth. The computing devices may comprise a smart phone, tablet, local server, in-vehicle computer system, and so forth. For example, the computing device 108 may comprise a smart phone that includes a display. The display of the smart phone may be used to present a graphical user interface.

In some situations, there may be bystanders 110 near the HMWD 106. For example, the user 102 wearing the HMWD 106 may be standing in a crowd, sitting on a bus, sitting in an auditorium, walking down a street, and so forth.

The HMWD 106 may include input devices 112 and output devices 114. The input devices 112 may produce sensor data 116. The sensor data 116 may be used by an I/O module 118 to operate one or more of the output devices 114. For example, sensor data 116 may be used to affect operation of a visual indicator device, as described below.

The HMWD 106 may also include a communication module 120. The communication module 120 may be configured to establish communication with other devices. The communication module 120 may use one or more communication interfaces to establish communication with the other devices via one or more networks 122. For example, the network 122 may comprise a personal area network, local area network, metropolitan area network, wide area network, and so forth. The HMWD 106 may use the networks 122 to access one or more services that are provided by the other devices. For example, the HMWD 106 may establish communication with one or more servers 124. These one or more servers 124 may provide one or more services, such as automated speech recognition, information retrieval, messaging, and so forth.

The communication module 120 may also be used to establish communications with one or more other users 126. For example, the user 102 of the HMWD 106(1) may initiate a realtime call (RTC) with the user 126(1) who is also wearing a HMWD 106(2). Audio associated with the RTC may be transferred using the network 122. Management of the call may be facilitated by one or more services executing on the one or more servers 124. The HMWD 106 may also be used to facilitate communication with other devices. For example, the HMWD 106(1) used by the user 102 may be used to establish communication with a user 126(2) that is using an application executing on a computing device 108 (2).

The HMWD 106 may include one or more input devices 112. For example, the HMWD 106 may include one or more of an ambient light sensor (ALS) 128, microphone 130, touch sensor 132, buttons, and so forth. The microphones 130 may include one or more of bone conduction microphones (BCM) or air conduction microphones (ACM), and so forth.

The ALS 128 may generate light sensor data 134. The light sensor data 134 may comprise information about the ambient lighting proximate to the HMWD 106. The light sensor data 134 may include intensity data 136 and color data 138. For example, the ALS 128 may comprise an ISL29125 light sensor from Intersil Corporation of Milipitas, Calif., United States of America. In another example, the ALS 128 may comprise an OPT3006 from Texas Instruments, Inc. of Dallas, Tex., United States of America. The ALS 128 may be sensitive to light at a particular wavelength, or at multiple wavelengths. For example, the ISL29125 utilizes a red, green, and blue sensor to provide color data 138 and intensity data 136 about the ambient light while the OPT3006 provides only intensity data 136 for a particular wavelength of light.

The intensity data 136 comprises information about the measured intensity of the ambient light as detected by the ALS 128. The intensity data 136 may comprise an instantaneous value at a particular time, a maximum value for a particular period of time, an average over a particular period of time, a moving average over a particular period of time, and so forth. The intensity data 136 may be expressed as a relative scale, such as a 12-bit value, or a calibrated unit such as lumens per square meter.

The color data 138 may comprise information about a color value of the ambient light. For example, the color data 138 may be indicative of a color temperature of the ambient light. The color temperature of a light source is a temperature, expressed in Kelvins (K), of an ideal black-body radiator that radiates light at a color that is comparable to the light source. For example, a 5000 K light source has a color that is equivalent to a black-body radiator heated to that temperature. It is important to note that color temperature does not indicate a thermal temperature of a light source in operation. For example, a light emitting diode (LED) may emit white light with a color temperature of 5000 K, but may be cool to the touch. Lower color temperatures indicate light that has more yellow or red tint while higher color temperatures are bluish. For example, a 2400 K color temperature may be described as a "warm white" light such as produced by an incandescent light bulb, while a bluish fluorescent light may have a color temperature of 5000 K.

The ALS 128 may include sensors that are able to detect light at different wavelengths. For example, the ALS 128 may have a red sensor, a green sensor, and a blue sensor that detect the intensity of light at these wavelengths. The ALS 128 may produce color data 138 that is indicative of intensity of the light at these respective wavelengths, or may produce a single output, such as an overall color that is based on the data from these sensors.

The microphones 130 are used to produce audio input data 140. For example, the BCM may comprise an accelerometer, gyroscope, vibration sensor, and so forth that detect the vibrations in the head 104 of the user 102 that result from utterances of the user 102. The ACM may comprise a diaphragm or other elements that move in response to the displacement of air by sound waves. The audio input data

140 may comprise digitized audio, such as pulse code modulated (PCM) audio data.

The touch sensor 132 may be located on one or more of the temples of the HMWD 106. The touch sensor 132 may comprise a capacitive touch sensor, a force sensitive resistor touch sensor, an optical touch sensor, and so forth. Touch input data 142 may be generated that is indicative of the location, direction, duration and so forth of the touch. For example, the touch input data 142 may comprise a serialized data stream indicative of particular points on the touch sensor 132 that detect a touch.

The I/O module 118 may determine state data 144. The state data 144 provides information indicative of operation of one or more devices that are onboard the HMWD 106. For example, the I/O module 118 may receive data that indicates the microphone 130 is powered up and ready to begin acquiring audio input data 140. The I/O module 118 may generate state data 144 that indicates the microphone 130 is operational. In another example, the I/O module 118 may receive data from the communication module 120 that information is being received from the server 124, such as a request to establish a realtime call from the user 126(1). The state data 144 may then indicate an incoming realtime call.

In some implementations, the state data 144 may comprise information for devices that are associated with, but external to, the HMWD 106. For example, the state data 144 may indicate an incoming message has been received by the computing device 108 from an external computing device. A device that provides information which is ultimately used by the HMWD 106 may be considered associated. For example, the HMWD 106 may be "paired" to the computing device 108 with a Bluetooth connection, providing a communication path for the computing device 108 to send information about the presence of the incoming message to the HMWD 106. In another example, the HMWD 106 and a robot may be in communication with a network service. The robot may send information about the state of the robot to the network service, which in turn sends information about that state of the robot to the HMWD 106. The robot and the HMWD 106 are not in direct communication but information about the robot is ultimately provided to the HMWD 106.

The state data 144 may also be indicative of operation of an application that is executing on the HMWD 106 or on an external computing device that is in communication with the HMWD 106. For example, the state data 144 may comprise information that indicates data is available for retrieval.

A visual indicator control module (VICM) 146 may be used to determine one or more of an output intensity value 148 or output color value 150. These values may then be used to control a visual indicator device (VID) 152. The VICM 146 may utilize techniques such as pulse width modulation. For example, the output intensity value 148 may result in a particular pulse width for activation of the VID 152. In another example, the output intensity value 148 may result in a particular voltage to be used to activate the VID 152.

The VICM 146 may use the sensor data 116, such as the light sensor data 134, to control operation of the VID 152. For example, the brightness, color, illumination pattern, and so forth of the VID 152 may be controlled by the VICM 146.

The VID 152 is an output device 114 that provides a visual signal that may be perceived by the user 102. The VID 152 may comprise an emissive device, a reflective device, or a combination thereof. An emissive device emits photons (light) while a reflective device utilizes ambient light. For example, the emissive device may comprise a light emitting diode, an electroluminescent light, a fluorescent light, an incandescent light, a quantum dot, laser, and so forth. Upon application of electrical power, these lights emit photons. In comparison, reflective devices may comprise a liquid crystal element, a microelectromechanical device, an electrophoretic element, a cholesteric element, or an interferometric element. For example, an electrophoretic element may be able to change between a white and a black color, changing the appearance. In some implementations, a combination of devices may be used. For example, an emissive device may be used to provide illumination to a reflective device. Continuing the example, an LED may be used to frontlight an electrophoretic element.

In some implementations the VID 152 may be able to produce light with different overall colors. For example, the VID 152 may comprise components that produce red, green, and blue light. By varying the relative contribution of each, such as by pulse width modulation, the overall color of the VID 152 may change. In some implementations the VID 152 may be able to emit white light with a color temperature of between 2500K and 6500 K. In other implementations the VID 152 may emit particular colors, such as red, green, blue, yellow, and so forth.

The VID 152 is positioned within the typical field of view of the user 102. The VID 152 may be positioned on an interior surface of the HMWD 106 that is closest to the face of the user 102. For example, the VID 152 may be located on an inner surface of a front frame of the HMWD 106, above the right lens and to the right of a vertical centerline of that right lens. Placement and operation of the VID 152 is discussed in more detail below.

The VICM 146 may be configured to operate the VID 152 when the state data 144 indicates a specified condition is present. For example, the state data 144 may indicate that the microphone 130 is active and the specified condition may be "the microphone is active". As a result, responsive to the microphone 130 being activated, the VICM 146 may operate the VID 152 to provide a visual signal to the user 102.

The VICM 146 may operate the VID 152 such that operation of the VID 152 is unobtrusive to bystanders 110. For example, the intensity data 136 may be used by the VICM 146 to determine an output intensity value 148. The output intensity value 148 is indicative of how much illumination the VID 152 is to produce during operation. The output intensity value 148 may be a relative number, such as an 8-bit value, or may be a calibrated unit such as lumens. In one implementation, a lookup table may specify an association between a particular intensity value from the ALS 128 and a particular output intensity value 148. For example, intensity data 136 indicative of 50 lux may be associated with an 8-bit output intensity value of 97. In other implementations, a mathematical function or executable code may be used to determine the output intensity value 148 given a particular value of intensity data 136.

Unobtrusiveness of the visual signal may be further enhanced by providing at least some matching between the color of the ambient light and the color produced by the VID 152. For example, the color data 138 may be used by the VICM 146 to determine the output color value 150. Continuing the example, if the color data 138 is indicative of a color temperature of 4700 K, then the output color value 150 may be set to 4700 K. As a result, the color of the light produced by the VID 152 may approximate the color of the ambient light. This avoids producing a visual signal that is obtrusive to the bystanders 110, such as a blue indicator light shining on the user's 102 face while in a room lit by candles.

The VICM 146 may control operation of the VID 152 to improve comfort of the user 102. For example, activation and deactivation of the VID 152 may be set to transition over a period of time. Continuing the example, during activation, light output may be increased from zero to the intensity specified by the output intensity value 148 over a period of time ranging from between 150 milliseconds (ms) to 300 ms. This prevents an abrupt activation which may startle or be otherwise unnerving to the user 102. Likewise, deactivation may have the intensity decrease to zero over some period of time.

The VICM 146 may operate the VID 152 to produce particular illumination patterns. An illumination pattern may comprise predetermine intervals of activation and deactivation, particular sequences of colors, and so forth. For example, a first illumination pattern may produce a blinking of the VID 152 that comprises 400 ms on followed by 500 ms off, repeating. In another example, a second illumination pattern may comprise producing green light for 400 ms followed by red light for 200 ms, repeating.

The HMWD 106 may include other output devices, such as speakers 154. These speakers 154 may include bone conduction speakers (BCS) or air conduction speakers (ACS) that provide sound audible to the user 102 during operation.

By using the techniques described in this disclosure, a visual signal may be provided unobtrusively to the user 102. This visual signal may provide information about the operation of the HMWD 106, such as operation of an input device 112, status of communication with external devices, and so forth. For example, if the HMWD 106 is being used to communicate with a voice activated service, a visual signal may be presented.

While the HMWD 106 is described in the form factor of eyeglasses, the HMWD 106 may be implemented in other form factors. For example, the HMWD 106 may comprise a device that is worn behind an ear of the user 102, on a headband, jewelry, and so forth. In some implementations, the HMWD 106 may be deployed as a system, comprising several devices that are in communication with one another.

Figure 2:
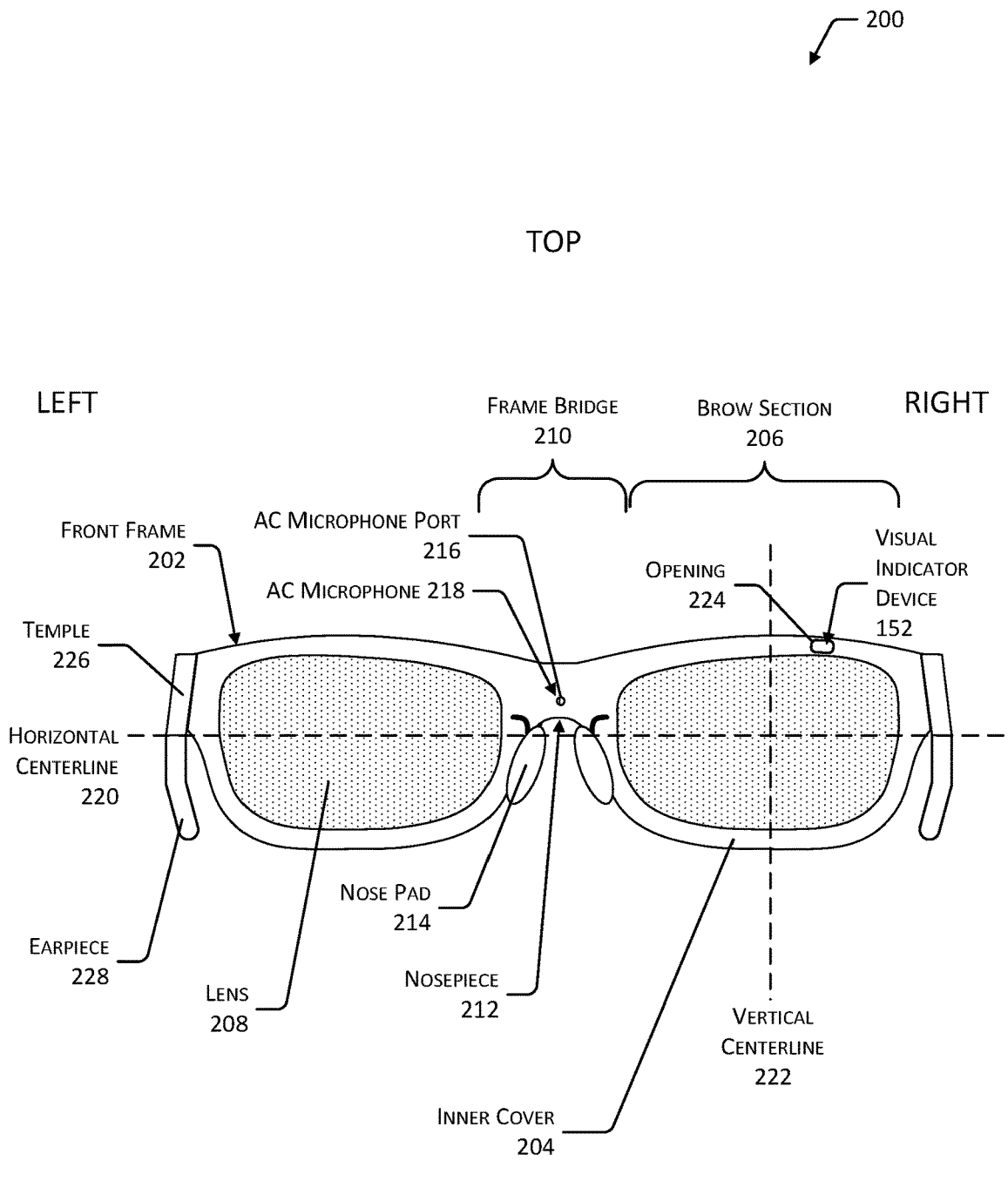
FIG. 2 depicts a view of a head-mounted wearable device, according to some implementations.
Figure 2:
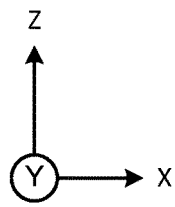

FIG. 2 depicts a view 200 of a HMWD 106, according to some implementations. This view is from the point of view of a user 102.

The HMWD 106 comprises a front frame 202. The front frame 202 may comprise cavities or spaces for various devices. An inner cover 204 is arranged on an interior side of the front frame 202 and closes or conceals those cavities or spaces. The inner cover 204 may be affixed to the front frame 202 by way of mechanical interference fit, fasteners, adhesives, and so forth.

The front frame 202 may include a left brow section 206(L) and a right brow section 206(R). Each brow section 206 may include a lens 208. A frame bridge 210 joins the left brow section 206(L) and the right brow section 206(R).

In some implementations, the front frame 202 may comprise a single piece of material, such as a metal, plastic, ceramic, composite material, and so forth. For example, the front frame 202 may comprise 6061 aluminum alloy that has been milled to the desired shape and to provide space for devices within. In another example, the front frame 202 may comprise injection molded plastic. In other implementations, the front frame 202 may comprise several discrete pieces that are joined together by way of mechanical engagement features, welding, adhesive, and so forth.

The lenses 208 may have specific refractive characteristics, such as in the case of prescription lenses. The lenses 208 may be clear, tinted, photochromic, electrochromic, and so forth. For example, the lenses 208 may comprise piano (non-prescription) tinted lenses to provide protection from the sun. In some implementations, only a single lens 208 may be installed, or the lenses 208 may be omitted.

A nosepiece 212 may be affixed to the frame bridge 210. One or more nose pads 214 may be affixed to, or integral with, the nosepiece 212. The nose pads 214 aid in the support of the front frame 202 and may improve comfort of the user 102.

The inner cover 204 at the frame bridge 210 may include an air conduction microphone (ACM) port 216. The ACM port 216 may comprise a passageway or hole through the inner cover 204 that allows sound vibrations to be conveyed to an ACM 218 located within the frame bridge 210.

Depicted are a horizontal centerline 220 and a vertical centerline 222. The horizontal centerline 220 may extend through the optical centers of the lenses 208. For example, the horizontal centerline 220 may extend from left to right. The vertical centerline 222 is perpendicular to the horizontal centerline 220 and may extend through the optical center of a particular lens 208. For example, the vertical centerline 222 may extended top to bottom through the optical center of the right lens 208. In other implementations the centerlines may be referenced to other points or features. For example, instead of an optical center, the centerlines may be aligned to geometric center of the lens 208.

The inner cover 204 includes one or more openings 224 to provide for visibility of the VID 152. The opening 224 may provide a passage through which illumination produced by the VID 152 may be emitted.

In some implementations, instead of or in addition to an opening 224, the inner cover 204 may be translucent, transparent, or include a window through which the light from the VID 152 is visible to the user 102. For example, the inner cover 204 may comprise translucent plastic that transmits at least a portion of the light emitted by a light of the VID 152.

The opening 224 may be placed in an upper right quadrant of the right brow section 206(R), such as shown here. This places the light from the VID 152 within the field of view of the user 102. The opening 224 may be positioned at other locations on the inner cover 204, such as proximate to the temple 226. In other implementations additional openings 224 may be present, additional VID 152 may be present, and so forth.

Figure 3:
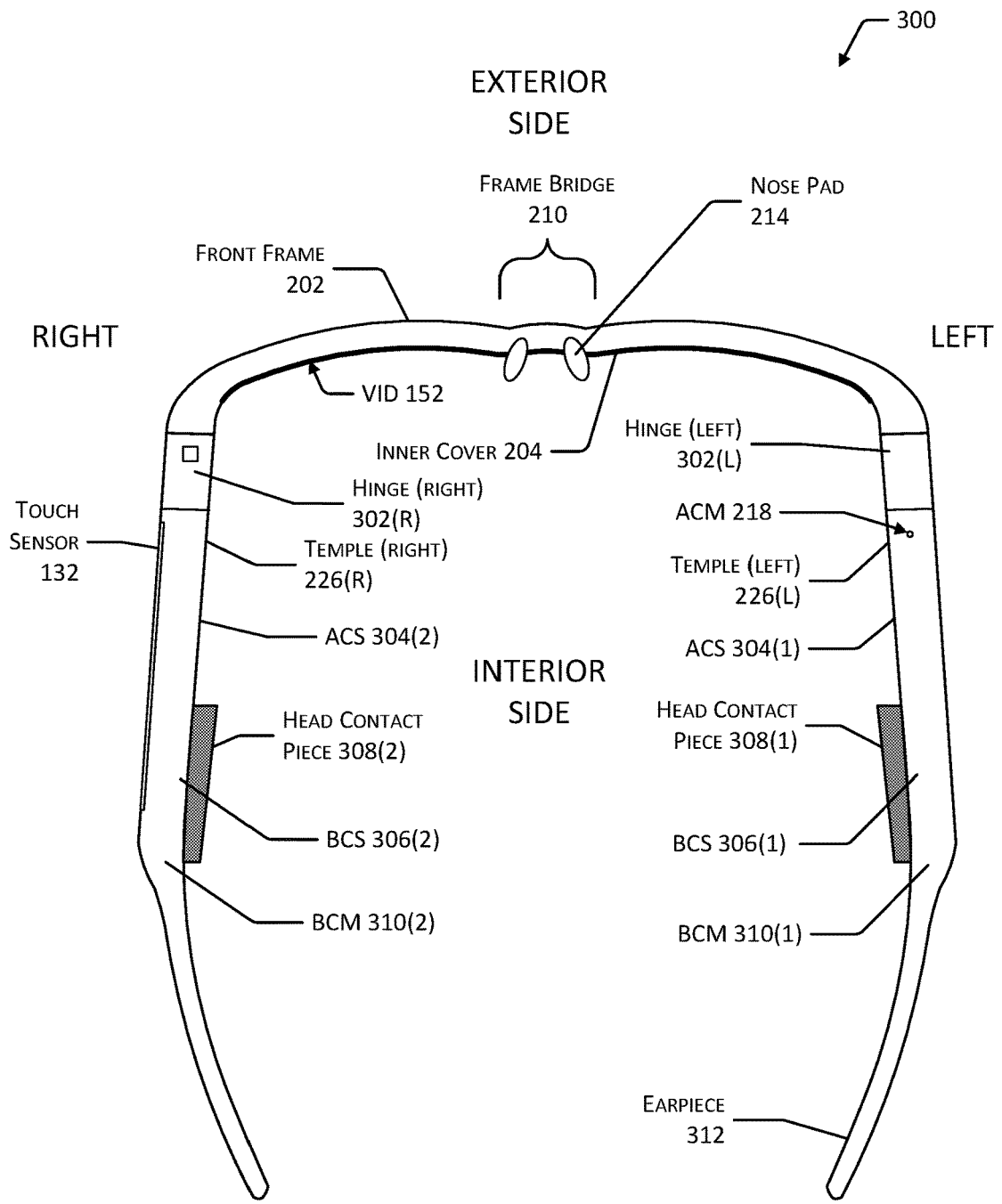
FIG. 3 depicts an exterior view, from below, of the head-mounted wearable device in an unfolded configuration, according to some implementations.

FIG. 3 depicts an exterior view 300, from below, of the HMWD 106 in an unfolded configuration, according to some implementations. In this view, the front frame 202 is visible along with the inner cover 204. The VID 152 is also shown in the brow section 206 of the right eye.

One or more hinges 302 may be affixed to, or an integral part of, the front frame 202. Depicted are a left hinge 302(L) and a right hinge 302(R) on the left and right sides of the front frame 202, respectively. The left hinge 302(L) is arranged at the left brow section 206(L), distal to the frame bridge 210. The right hinge 302(R) is arranged at the right brow section 206(R) distal to the frame bridge 210.

The temple 226 may couple to a portion of the hinge 302. For example, the temple 226 may comprise one or more components, such as a knuckle, that mechanically engage one or more corresponding structures on the hinge 302.

The left temple 226(L) is attached to the left hinge 302(L) of the front frame 202. The right temple 226(R) is attached to the right hinge 302(R) of the front frame 202.

The hinge 302 permits rotation of the temple 226 with respect to the hinge 302 about an axis of rotation. The hinge 302 may be configured to provide a desired angle of rotation.

For example, the hinge 302 may allow for a rotation of between 0 and 120 degrees. As a result of this rotation, the HMWD 106 may be placed into a folded configuration. For example, each of the hinges 302 may rotate by about 90 degrees inward with the temples 226 moving toward the front frame 202.

One or more of the front frame 202, the hinge 302, or the temple 226 may be configured to dampen the transfer of vibrations between the front frame 202 and the temples 226. For example, the hinge 302 may incorporate vibration damping structures or materials to attenuate the propagation of vibrations between the front frame 202 and the temples 226. These vibration damping structures may include elastomeric materials, springs, and so forth. In another example, the portion of the temple 226 that connects to the hinge 302 may comprise an elastomeric material.

One or more different sensors or other input devices 112 may be placed on the HMWD 106. For example, the touch sensor 132 may be arranged along an exterior surface of the right temple 226(R). In another example, a first ACM 218 may be located at the frame bridge 210, while a second ACM 218 is located in the left temple 226(L), a third ACM 218 is located in the right temple 226(R), and so forth. In another example, a fourth ACM 218 may be located within or proximate to the left hinge 302(L), such as on the underside of the left hinge 302(L). The ACMs 218 may have corresponding ACM ports 216. For example, the ACM 218 may have an ACM port 216 that provides a passageway between the exterior environment and the ACM 218.

The ACM 218 may comprise a diaphragm, MEMS element, or other elements that move in response to the displacement of air by sound waves. Data produced by the ACM 218 may be generated that is indicative of the sound detected by the ACM 218. For example, the audio input data 140 may be generated based on input from one or more ACMs 218.

The HMWD 106 may include one or more ACSs 304. For example, a first ACS 304(1) is located in the left temple 226(L) and a second ACS 304(2) is located in the right temple 226(R). The ACS 304 is designed to produce vibrations in the surrounding air. For example, the ACS 304 may comprise a diaphragm that is moved to generate sound waves in the air. The ACS 304 may use one or more mechanisms to generate sound waves. These mechanisms may include, but are not limited to: voice coils, piezoelectric elements, metallic ribbon elements, magnetorestrictive elements, electrostatic elements, and so forth. The ACS 304 may operate to produce sound between 500 Hertz (Hz) and 20 kHz. For example, the ACS 304 may comprise the Cobra electrodynamic transducer model number 2403-260-0091 from Knowles Electronics, LLC. of Itasca, Ill., United States of America.

The ACS 304 may have a speaker opening (not shown) that allows sound to be transferred from the ACS 304 to the surrounding environment. The speaker opening may comprise one or more holes that provide a passageway or hole through an exterior housing to the exterior environment. In some implementations the speaker opening may be covered or filled with a grill, mesh, fabric, elastomeric material, and so forth.

One or more bone conduction speakers (BCS) 306 may be emplaced on the temples 226. For example, as depicted here, a BCS 306 may be located on the surface of the temple 226 that is proximate to the head 104 of the user 102 during use.

A movable element of the BCS 306 may be in mechanical contact with the head 104 of the user 102 and produces BCS 306 audio output that is physical displacement or vibrations in the head 104 of the user 102. These vibrations are then perceived as sound by the ear of the user 102. In one implementation, the BCS 306 may comprise a piezoelectric material that, upon application of a voltage, physically changes shape. In another implementation, the BCS 306 may comprise an electromagnet that, upon application of a voltage, moves a core.

In some implementations, the BCS 306 may be used to provide the functionality of the BCM 310. For example, the BCS 306 may be used to detect vibrations of the user's 102 head 104.

A head contact piece 308 may be affixed to, or part of, the BCS 306 in some implementations. Performance of the BCS 306 improves when there is sufficient mechanical coupling with a portion of the head 104 of the user 102. However, different users 102 may exhibit different head 104 shapes. To improve mechanical coupling between the BCS 306 and different head shapes, a head contact piece 308 may be affixed to the BCS 306. In one implementation, the head contact piece 308 may be wedge shaped, having a thicker end and tapering to a thinner end. The thickest part of the wedge may be positioned towards the front of the BCS 306, closest to the front of the HMWD 106. In other implementations, the head contact piece 308 may exhibit other shapes. For example, the head contact piece 308 may be concave.

The head contact piece 308 may be removeable or adjustable to accommodate different shapes of heads 104. For example, magnets may be used to join the head contact piece 308 to the BCS 306. In another example, one or more of the BCS 306 or the head contact piece 308 may include a magnetically receptive material that is attracted to magnets on the opposing structure.

The head contact piece 308 may comprise an elastomeric material that conforms at least partially to the contour of the head 104. For example, the head contact piece 308 may comprise one or more thermoplastic elastomers exhibiting a Shore hardness of 40 A. In other implementations, the head contact piece 308 may comprise a rigid material, or a combination of soft and hard materials. For example, a rigid inner component may be coated with an elastomer.

The ACS 304 may be mounted in the same temple 226 as the BCS 306. For example, as shown here the left temple 226(L) includes the BCS 306(1) and the ACS 304(1).

The HMWD 106 may include one or more BCMs 310. The BCM 310 is responsive to the vibrations produced by the user 102, such as while speaking. For example, the BCM 310 may comprise an accelerometer, gyroscope, vibration sensor, and so forth that detect the vibrations in the head 104 of the user 102 that result from utterances of the user 102. The BCM 310 may be arranged to be in contact with the skin above a bony or cartilaginous structure. For example, where the HMWD 106 is in the form of eyeglasses, nose pads 214 of a nosepiece 212 may be mechanically coupled to the BCM 310 such that vibrations of the nasal bone, glabella, or other structures upon which the nose pads 214 may rest are transmitted to the BCM 310. In other implementations, the BCM 310 may be located elsewhere with respect to the HMWD 106, or worn elsewhere by the user 102. For example, the BCM 310 may be incorporated into the temple 226 of the HMWD 106, a hat or headband.

One or more buttons may be placed in other locations on the HMWD 106. For example, a button may be emplaced within, or proximate to, the right hinge 302(R), such as on an underside of the right hinge 302(R).

An earpiece 312 may extend from a portion of the temple 226 that is distal to the front frame 202. The earpiece 312 may comprise a material that may be reshaped to accommodate the anatomy of the head 104 of the user 102. For example, the earpiece 312 may comprise a thermoplastic that may be warmed to predetermined temperature and reshaped. In another example, the earpiece 312 may comprise a wire that may be bent to fit. The wire may be encased in an elastomeric material.

One or more components of the HMWD 106 may comprise single unitary pieces or may comprise several discrete pieces. For example, the front frame 202 and the nosepiece 212 may comprise a single piece, or may be constructed from several pieces joined or otherwise assembled.

Figure 4:
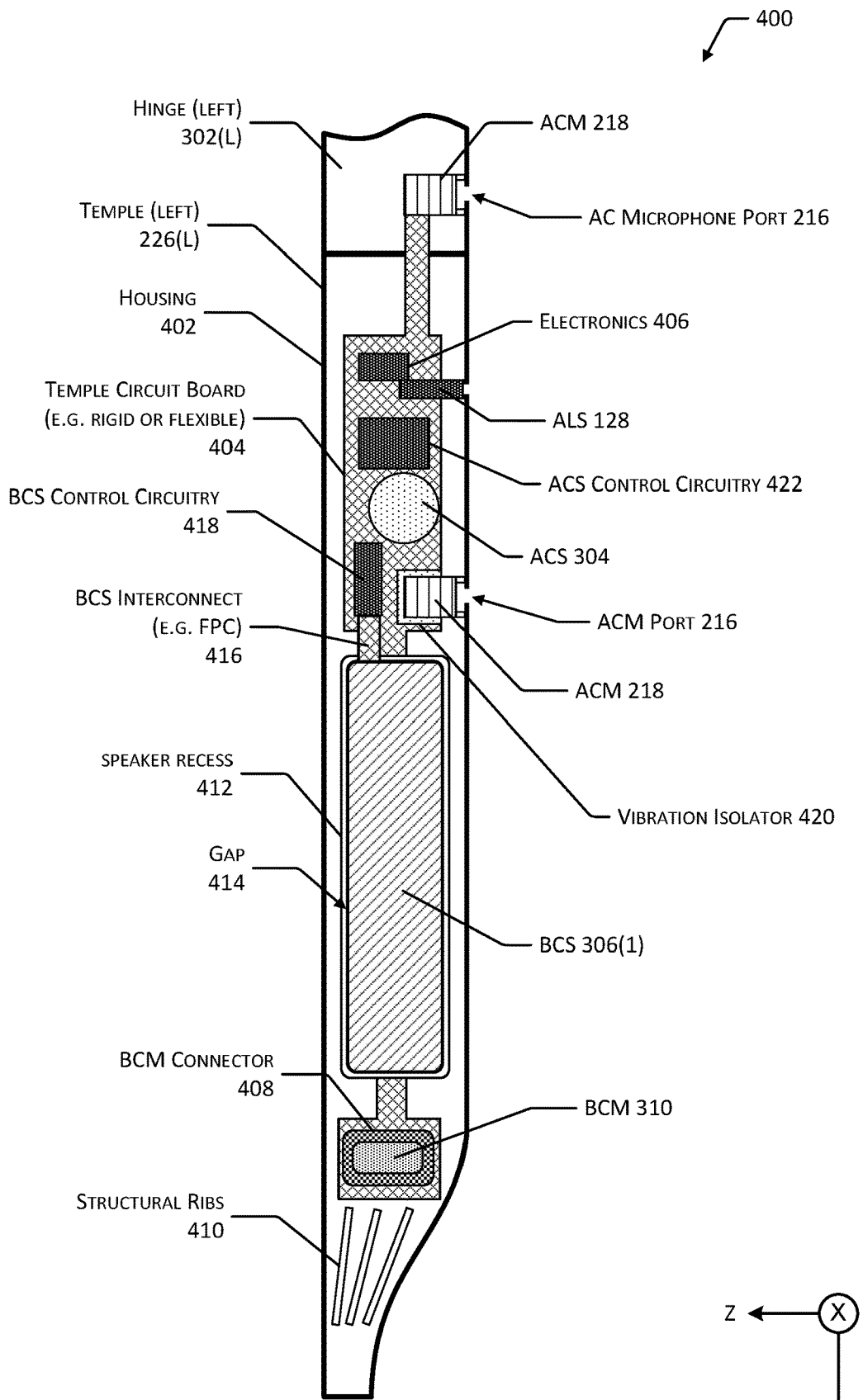
FIG. 4 depicts a view of some of the internal components of a temple of a head-mounted wearable device, according to some implementations.

FIG. 4 depicts a view 400 of some of the internal components of a left temple 226(L) of a HMWD 106, according to some implementations. The depiction of the left temple 226(L) is provided by way of example and not necessarily as a limitation. For example, the same or similar structures as described herein may be installed in the right temple 226(R).

A portion of the hinge 302 is depicted. Arranged within the hinge 302 is the ACM 218. The ACM port 216 for the ACM 218 in the hinge 302 is depicted. The ACM port 216 may open generally downwards. For example, the aperture of the ACM port 216 may be on a bottom surface of the hinge 302 and may open towards the feet of the user 102 during normal wear.

As described above, the hinge 302 is coupled to a temple 226. The temple 226 may comprise a housing 402. The housing 402 may comprise one or more elements that serve to enclose at least a portion of the temple 226. The housing 402 may comprise a plastic, metal, ceramic, composite material, and so forth.

A temple circuit board 404 is depicted. The temple circuit board 404 may comprise a rigid or flexible circuit board. For example, the temple circuit board 404 may comprise a flexible printed circuit. In some implementations, the temple circuit board 404 may extend at least partially into the hinge 302. For example, the ACM 218 may be connected to the temple circuit board 404.

Electronics 406 may be connected to, affixed to, or otherwise in communication with the temple circuit board 404. For example, integrated circuits may be laminated to the temple circuit board 404. For example, the ALS 128 may be mounted to the temple circuit board 404. A hole or window in the housing 402 may allow the sensors in the ALS 128 to detect ambient light. The window may be located on the underside as shown here, or on any other side of the temple 226. In other implementations the ALS 128 may be located elsewhere on the HMWD 106. For example, the ALS 128 may be located in the front frame 202. In another example, the ALS 128 may be mounted such that the hole or window is on an exterior surface of the temple 226, such as on a side of the temple 226 that is opposite the head 104 of the user 102.

A BCM connector 408 may be affixed to the temple circuit board 404. For example, a pressure sensitive adhesive (PSA) may be used to join the temple circuit board 404 and the BCM connector 408. In some implementations, the BCM connector 408 may comprise a flexible or elastomeric material into which the BCM 310 may be emplaced. In the implementation depicted here, the BCM 310 is located proximate to the distal end of the temple 226 and is thus closer to the earpiece 312 than the BCS 306.

Depicted in this illustration are structural ribs 410. The structural ribs 410 may be used to add rigidity to a distal portion of the temple 226. The structural ribs 410 may also improve structural support for the earpiece 312 (not shown).

Also depicted is a BCS 306. The BCS 306 may be emplaced at least partially within a speaker recess 412. The speaker recess 412 extends within the housing 402 of the temple 226. When mounted within the speaker recess 412, the BCS 306 is affixed to a bottom of the speaker recess 412 and a gap 414 around a perimeter of the BCS 306 and one or more walls of the speaker recess 412 is maintained. By providing this mechanical separation from the sides of the BCS 306 and the housing 402, attenuation due to mechanical coupling between the housing 402 and the BCS 306 is minimized. As a result, output amplitude is increased, providing a greater range of available volume for the user 102.

The BCS 306 is connected via a BCS interconnect 416 to BCS control circuitry 418. The BCS interconnect 416 may comprise a flexible printed circuit, wiring harness, and so forth to provide an electrical connection between the BCS 306 and the BCS control circuitry 418. In some implementations, the BCS interconnect 416 may span the gap 414. In other implementations, the BCS interconnect 416 may comprise circuit traces arranged on the bottom of the speaker recess 412, and the bottom of the BCS 306 may utilize corresponding conductive pads to establish an electrical connection.

The BCS control circuitry 418 accepts BCS output data as input and generates a drive signal. For example, the BCS control circuitry 418 may comprise a digital to analog converter (DAC) and a power amplifier. The DAC converts the BCS output data to an analog signal, which may then be amplified using the power amplifier to produce the drive signal. The drive signal is then provided to the BCS 306 which vibrates to produce the BCS audio output.

In some implementations, a vibration isolator 420 may be used to provide some attenuation of mechanical vibration between the temple circuit board 404 and the ACM 218. For example, the vibration isolator 420 may comprise an elastomeric material such as a viscoelastic foam, acoustic foam, and so forth. In another example, the vibration isolator 420 may comprise a flexible member such as a living hinge, pleated material, flexible printed circuit board, and so forth. By attenuating the transfer of the mechanical vibration from the BCS 306 to the ACM 218(2), the input to the ACM 218(2) may include less noise.

The temple 226 may include one or more ACS 304. For example, the ACS 304 may be affixed or otherwise coupled to the temple circuit board 404. The ACS 304 may be configured with one or more ports to allow the transfer of sound produced by the ACS 304 to the environment outside of the housing 402. For example, the one or more ports of the ACS 304 may be arranged along a bottom of the temple 226, an interior side of the temple 226, an exterior side of the temple 226, a top of the temple 226, and so forth. In another example, the ACS 304 may be surface mounted on an outer surface of the housing 402.

ACS control circuitry 422 may be mounted to the temple circuit board 404. The ACS control circuitry 422 may comprise a DAC and a power amplifier that generates a drive signal. The DAC converts output audio data to an analog signal, which may then be amplified using the power amplifier to produce the drive signal. The drive signal is then provided to the ACS 304 which produces output.

Figure 5:
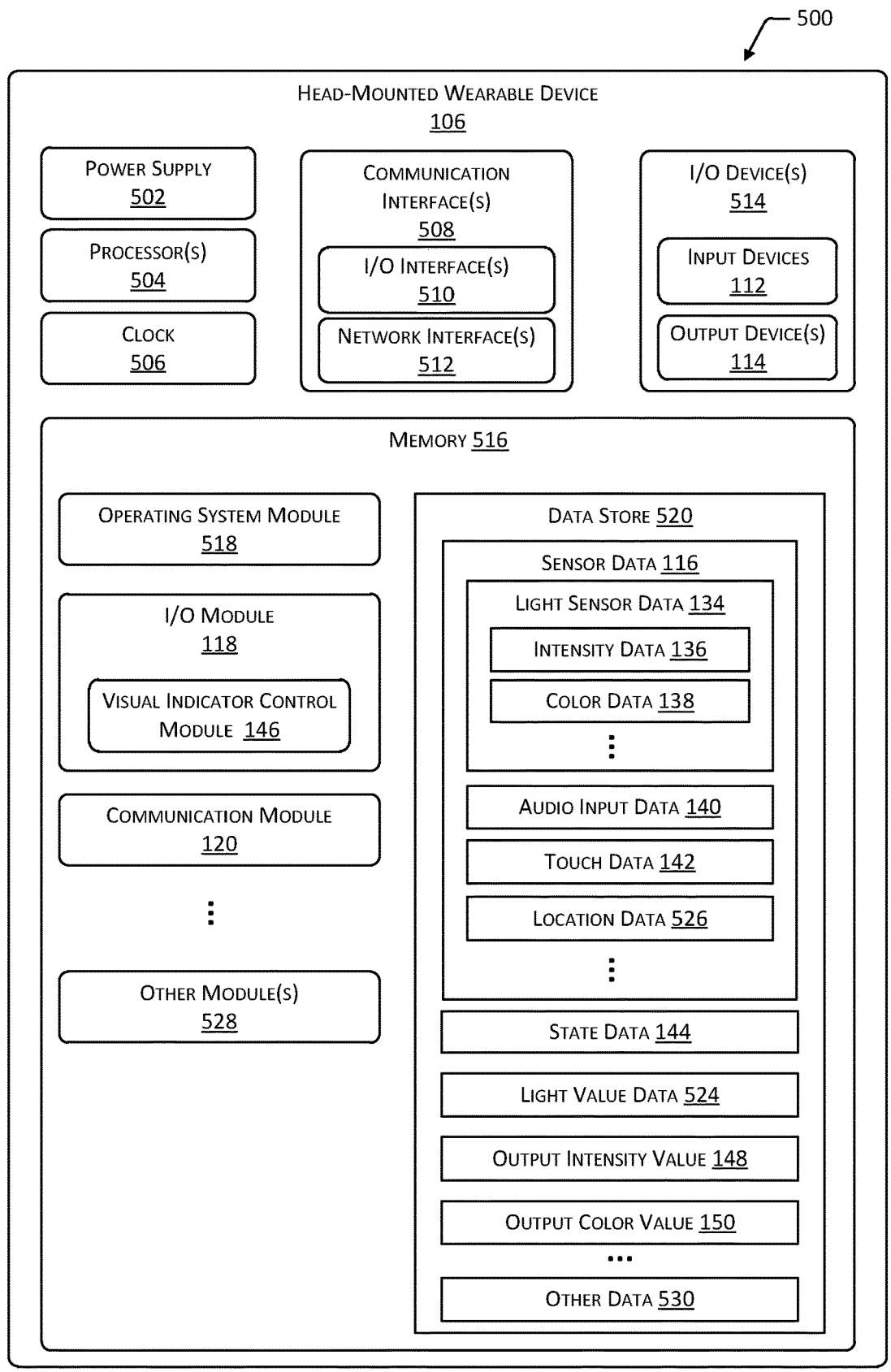
FIG. 5 is a block diagram of electronic components of the head-mounted wearable device, according to some implementations.

FIG. 5 is a block diagram 500 of components of the head-mounted wearable device 106, according to some implementations.

One or more power supplies 502 may be configured to provide electrical power suitable for operating the components in the HMWD 106. The one or more power supplies 502 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive or capacitive power transfer. In another implementation, electrical contacts may be used to recharge the HMWD 106.

The HMWD 106 may include one or more hardware processors 504 (processors) configured to execute one or more stored instructions. The processors 504 may comprise one or more cores. The processors 504 may include general purpose microprocessors, microcontrollers, application specific integrated circuits (ASICs), digital signal processors (DSPs), and so forth. One or more clocks 506 may provide information indicative of date, time, ticks, and so forth. For example, the processor 504 may use data from the clock 506 to associate a particular interaction with a particular point in time.

The HMWD 106 may include one or more communication interfaces 508 such as input/output (I/O) interfaces 510, network interfaces 512, and so forth. The communication interfaces 508 enable the HMWD 106, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include input devices 112. The input devices 112 may include but are not limited to, the ALS 128, the ACM 218, the touch sensor 132, a camera, a proximity sensor, a barometer, a light sensor, an inertial measurement unit (IMU), a biomedical sensor, a magnetometer, and so forth. The IMU may comprise one or more of accelerometers or gyroscopes. Motion data may be acquired from the IMU. For example, the motion data may be used for fitness tracking, navigation, augmented reality, virtual reality, and so forth. The biomedical sensor may include one or more of a pulse sensor, oximeter, electrocardiograph, encephalograph, myelograph, respirometer, and so forth. Biomedical data may be acquired from one or more of the biomedical sensors. For example, the biomedical data may be used for fitness tracking.

The I/O devices 514 may also include output devices 114. The output devices 114 may include but are not limited to the VID 152, speakers 154, haptic output devices, and so forth.

In some embodiments, the I/O devices 514 may be physically incorporated with the HMWD 106 or may be externally placed. The output devices 114 are configured to generate signals, which may be perceived by the user 102 or may be detected by input devices 112.

The network interfaces 512 may be configured to provide communications between the HMWD 106 and other devices, such as the server 124. The network interfaces 512 may include devices configured to couple to personal area networks (PANs), wired or wireless local area networks (LANs), wide area networks (WANs), and so forth. For example, the network interfaces 512 may include devices compatible with Ethernet, Wi-Fi, Bluetooth, Bluetooth Low Energy, ZigBee, and so forth.

The HMWD 106 may also include one or more busses or other internal communications hardware or software that allow for the transfer of data between the various modules and components of the HMWD 106.

As shown in FIG. 5, the HMWD 106 includes one or more memories 516. The memory 516 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 516 provides storage of computer-readable instructions, data structures, program modules, and other data for the operation of the HMWD 106. A few examples of functional modules are shown stored in the memory 516, although the same functionality may alternatively be implemented in hardware, firmware, or as a system on a chip (SoC).

The memory 516 may include at least one operating system (OS) module 518. The OS module 518 is configured to manage hardware resource devices such as the I/O interfaces 510, the I/O devices 514, the communication interfaces 508, and provide various services to applications or modules executing on the processors 504. The OS module 518 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 516 may be a data store 520 and one or more of the following modules. These modules may be executed as foreground applications, background tasks, daemons, and so forth. The data store 520 may use a flat file, database, linked list, tree, executable code, script, or other data structure to store information. In some implementations, the data store 520 or a portion of the data store 520 may be distributed across one or more other devices including servers 124, network attached storage devices, and so forth.

The I/O module 118 may be stored in the memory 516. The I/O module 118 may perform functions such as acquiring state data 144, controlling the operation of one or more of the input devices 112 or output devices 114, and so forth.

The memory 516 may also include the VICM 146. The VICM 146 may be configured to control operation of the VID 152. For example, the VICM 146 may use the state data 144 to determine if one or more conditions are present. If those conditions are, such as activation of a microphone 130, the VICM 146 may activate the VID 152.

Light value data 524 may be stored in the data store 520. The light value data 524 may specify information such as particular conditions, values of those conditions, illumination patterns, colors associated with particular conditions, and so forth. For example, the light value data 524 may specify a particular blink pattern using a particular color that is associated with a particular condition.

The memory 516 may store the sensor data 116 as described above. The sensor data 116 may include location data 526 that is indicative of a location of the HMWD 106. The location data 526 may indicate a latitude and longitude, country, state, city, street address, zip code, and so forth. The location data 526 may be obtained from an input device 112 such as a satellite radio navigation system, from an external source such as a cellular data network, and so forth. The location data 526 may be used by the VICM 146 to operate the VID 152. For example, based on the location data 526 and the time of day, the VICM 146 may modify one or more of the output intensity value 148 or the output color value 150. Continuing the example, at night the output intensity value 148 may be decreased, or the color temperature of the light from the VID 152 may be adjusted to simulate the daily changes in the color of daylight.

In another implementation, the VICM 146 may use the location data 526 to specify particular preferences for use. For example, the user 102 may have specified particular conditions or preferences for operation at work that differ from home. Based on the location data 526, the appropriate set of preferences may be selected and used by the VICM 146.

The memory 516 may store a communication module 120 that is configured to establish communications with one or more of the computing devices 108, other HMWDs 106, servers 124, input devices 112, or other devices. The communications may be authenticated, encrypted, and so forth.

During operation, the HMWD 106 may store sensor data 116 or other data at least temporarily, in the data store 520. Other modules 528 may also be present in the memory 516 as well as other data 530 in the data store 520. For example, the other modules 528 may include a contact management module while the other data 530 may include address information associated with a particular contact, such as an email address, telephone number, network address, uniform resource locator, and so forth.

Figure 6:
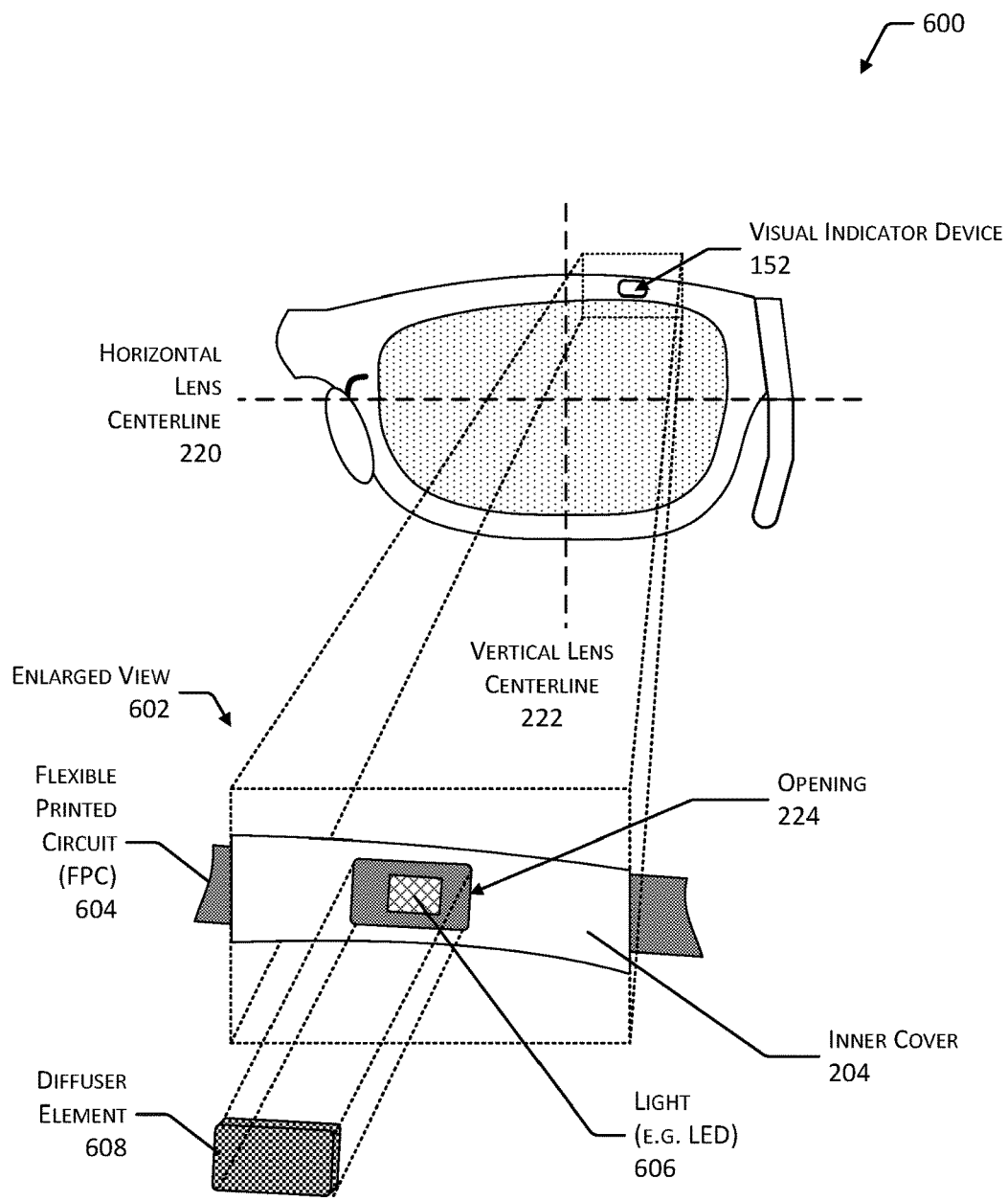
FIG. 6 is a view that includes an enlargement of the visual indicator device, according to one implementation.

FIG. 6 is a view 600 that includes an enlargement of the VID 152, according to one implementation. In this illustration, an enlargement of the right brow section 206(R) is shown. The VID 152 is positioned at an upper portion of the front frame 202.

A further enlargement 602 shows the portion of the HMWD 106 around the opening 224. The VID 152 may comprise a light 606 that emits light when activated. The VID 152 may include other circuitry associated with operating the light 606. For example, the VID 152 may include transistors, timers, microcontrollers, and so forth.

The light 606 is affixed to one or more electrical conductors, such as a wiring harness of a flexible printed circuit (FPC) 604 as shown here. As described above, the light 606 may be an emissive device, including but not limited to a light emitting diode, an electroluminescent light, a fluorescent light, an incandescent light, a laser, or a quantum dot.

The FPC 604 may allow for an exchange of electrical signals, optical signals, radio signals, power, and so forth, between devices in the HMWD 106. For example, the FPC 604 shown here is positioned within a recess that is enclosed between the front frame 202 and the inner cover 204. The FPC 604 here includes electrical conductors that may be used to provide power and control signals to the light 606.

The FPC 604 may extend through other portions of the HMWD 106. For example, an FPC 604 may provide connectivity between the left temple 226(L) and the right temple 226(R). Other devices such as the ACM 218 in the frame bridge 210, the VID 152, and so forth may connect to this or another FPC 604 or other wiring.

The opening 224 for the VID 152 is located in an upper portion of the inner cover 204 above the horizontal lens centerline 220 and to the right of the vertical lens centerline 222 for the right lens 208. In other implementations, the opening 224, the VID 152, and so forth may be located in other positions.

During operation, the light 606 emits photons which pass through the opening 224. In some implementations, a diffuser element 608 may be placed proximate to the opening 224. The diffuser element 608 may comprise an optically translucent or transparent material that is configured to diffuse incident light. For example, the diffuser element 608 may comprise translucent white plastic, transparent plastic with one or more embedded particles, etched glass, and so forth. In some implementations the diffuser element 608 may use one or more lenses or lens effects to disperse the light. For example, the diffuser element 608 may comprise a plurality of microscopic ridges, lens elements, or other features that disperse the light by way of diffraction or refraction.

An emissive area of the light 606 may comprise the area of the light 606 that emits photons. In some implementations the emissive area of the light 606 may be relatively small. For example, a surface mount LED may have an emissive area that is less than 0.5 square millimeters. Such a pinpoint source may be difficult for the user 102 to see, or may be uncomfortable. The diffuser element 608 may be placed in the opening 224, behind the opening 224, in front of the opening 224, or through the opening 224 and diffuses the light emitted from the light 606 to an area that is greater than the emissive area. For example, the diffuser element 608 may be about 1 mm tall and about 3 mm wide. This enlarged area may be more comfortable for the user 102 and may increase the visibility to the user 102 by covering a larger portion of the user's 102 visual field. For example, the larger rectangle of the illuminated diffuser element 608 may be easier to see than a pinpoint. By spreading out the illumination, operation of the VID 152 may be less obtrusive. For example, compared to a pinpoint of light, the diffuser element 608 illuminates a larger area of the face of the user 102, reducing the per unit area illumination. This reduces the obtrusiveness of the VID 152 when active.

In some implementations, instead of an opening 224 the inner cover 204 may have a transparent or translucent window. For example, the inner cover 204 may comprise translucent plastic, and the inner cover 204 may act as the diffuser element 608.

Figure 7:
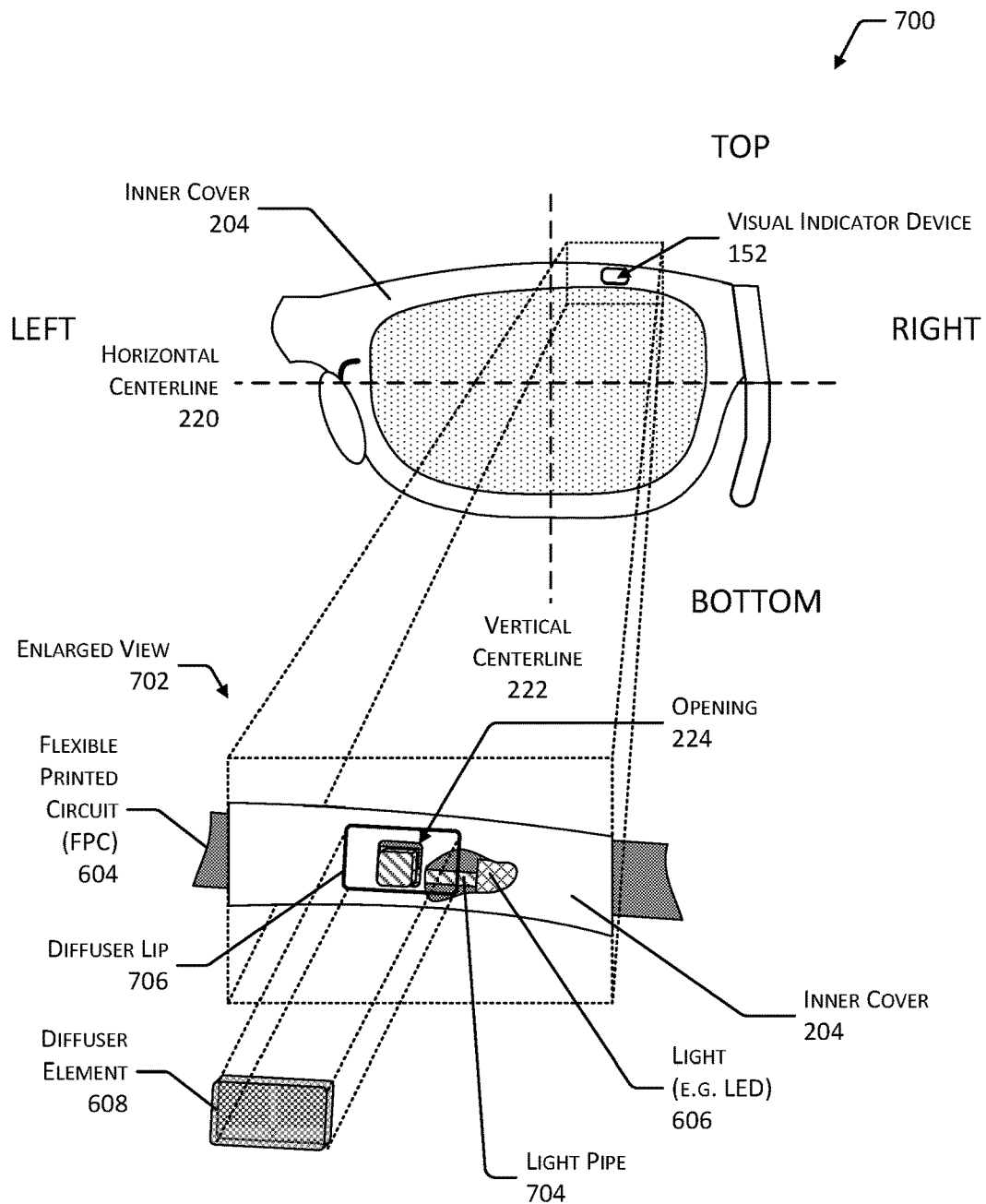
FIG. 7 is a view that includes an enlargement of the visual indicator device that utilizes a light pipe, according to one implementation.

FIG. 7 is a view 700 that includes an enlargement of the VID 152 that utilizes a light pipe, according to one implementation. A further enlargement 702 shows the portion of the HMWD 106 around the opening 224. In some situations, it may be advantages to position the light 606 at another location within the front frame 202, away from the opening 224. For example, due to space constraints the light 606 may be located in another portion of the front frame 202. A light pipe 704 may be used to convey light produced by the light 606 to the opening 224. The light pipe 704 may comprise an optical waveguide. The light pipe 704 may comprise an optical fiber, a transparent material such as acrylic or glass, and so forth. A first portion of the light pipe 704 is optically coupled to the light 606 such that at least some photons emitted from the light 606 enter the light pipe 704 and are transferred to a second portion of the light pipe 704. In this illustration, the light 606 is positioned to the right of the opening 224, and the light pipe 704 extends from the light 606 to the opening 224. In some implementations the light pipe 704 may extend out through the inner cover 204.

As described above, a diffuser element 608 may be used to increase the area from which light is emitted. In this illustration, the area of the diffuser element 608 is greater than the area of the opening 224. For example, the opening 224 may be 0.7 mm tall by 0.7 mm wide, while the diffuser element 608 is 1 mm tall by 3 mm wide. A diffuser lip 706 or other feature may be used to retain the diffuser element 608. For example, the diffuser element 608 may include a mechanical interference feature that engages the diffuser lip 706 and retains the diffuser element 608 to the inner cover 204.

It may be advantageous to reduce the size of the opening 224 in some implementations. For example, the size of the opening 224 may be reduced to increase strength of the inner cover 204. In another example, the size of the opening 224 may be reduced to minimize an entry point for possible contaminants into the interior of the HMWD 106. In these implementations, the diffuser element 608 may be at least partially atop the inner cover 204.

In another implementation one or more of the light pipe 704 or the diffuser element 608 may comprise a material such as silicone rubber, epoxy, and so forth. For example, during assembly a transparent silicone rubber may be injected through the opening 224. In another example, the diffuser element 608 may comprise a silicone rubber that is overmolded onto at least a portion of the inner cover 204.

In some implementations the light pipe 704 and the diffuser element 608 may comprise a unitary piece. For example, a single piece of transparent plastic with one end etched may convey light from the light 606 to the exterior of the inner cover 204 such that the light is visible to a user 102.

In some implementations, the VID 152 may be positioned to be on the same side of the HMWD 106 as the touch sensor 132. For example, if the touch sensor 132 is positioned on the right temple 226(R), the VID 152 may be positioned on the right side of the inner cover 204.

Various combinations of the above configurations may be utilized. For example, the light 606 may have a surface area of a desired size, such as an LED with an emissive area of 1 mm by 3 mm that extends proximate to or through the opening 224 in the inner cover 204 to be approximately flush with the interior surface of the inner cover 204 that is closest to the user 102 during use. A layer of silicone overmolding may be applied atop the light 606 and the opening 224.

Figure 8:
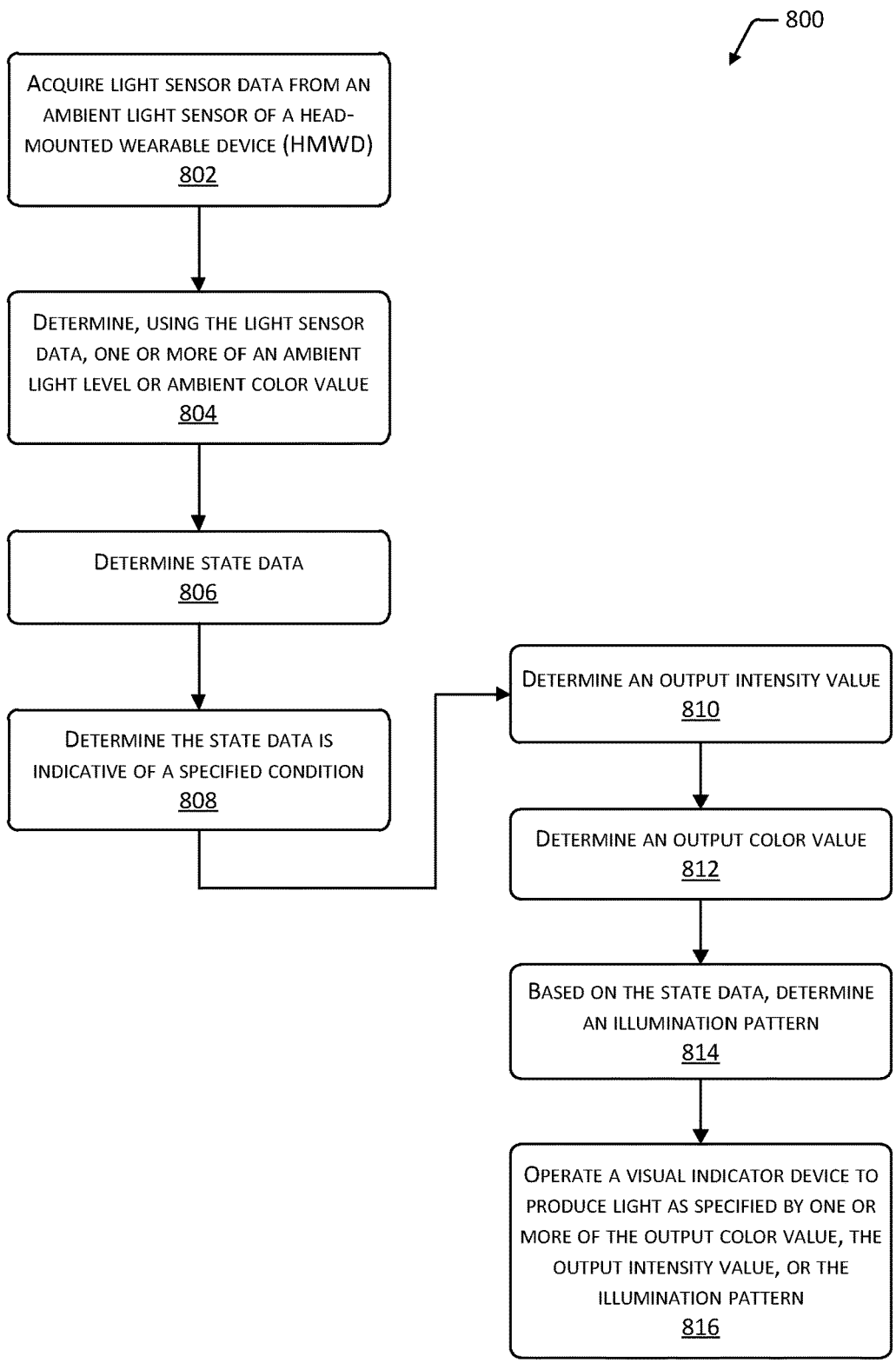
FIG. 8 is a flow diagram of a process to utilize the visual indicator device, according to some implementations.

FIG. 8 is a flow diagram 800 of a process to utilize the VID 152, according to some implementations. The process may be implemented at least in part by the HMWD 106.

At 802, light sensor data 134 is acquired from an ambient light sensor (ALS) 128.

At 804, using the light sensor data 134, one or more of an ambient light level of an ambient color value is determined. The light sensor data 134 may include intensity data 136, color data 138, and so forth. The intensity data 136 may be used to provide information about the ambient light level. For example, the intensity data 136 may comprise intensity information about the intensity of light at three different wavelengths, corresponding to red, green, and blue light. The color data 138 comprises information indicative of the color of the ambient light. For example, the color data 138 may comprise a determination of a color temperature value based on the different intensity values for the light at the three different wavelengths.

At 806, state data 144 is determined. For example, the state data 144 may be indicative of operation of one or more devices associated with the HMWD 106, of an application that is executing on a device in communication with the HMWD 106, and so forth. The state data 144 may be indicative of operation of a device of the HMWD 106 such as an input device 112, network interface 512, output device 114, and so forth. For example, the I/O module 118 may maintain the state data 144 for the I/O devices 514. In another example, the OS module 518 may maintain the state data 144 for devices, applications, and so forth. For example, the OS module 518 may receive state data 144 from the computing device 108. Continuing the example, the computing device 108 may receive an incoming call, and state data 144 indicative of this call may be maintained by the HMWD 106.

At 808, a determination is made that the state data 144 is indicative of one or more specified conditions. For example, the specified conditions that would be designated as producing a visual signal to the user may include, but are not limited to a microphone 130 being used by the HMWD 106 to acquire audio input data 140, that the HMWD 106 is booting up, a camera is being used by the HMWD 106 to acquire image data, the HMWD 106 being in communication with an external server 124, the HMWD 106 awaiting a response from the external server 124, realtime communication using the HMWD 106 is in progress, an inertial measurement unit is being used by the HMWD 106 to acquire motion data, a biomedical sensor is being used by the HMWD 106 to acquire biomedical data, and so forth.

At 810, an output intensity value 148 is determined. As described above, the output intensity value 148 specifies how much light the VID 152 is supposed to emit. The output intensity value 148 may be based on one or more of the intensity data 136 about the ambient light, the location data 526, time of day, user preferences, and so forth. For example, the output intensity value 148 may be proportionate to the ambient light level indicated by the intensity data 136. As the values of the intensity data 136 increases, the output intensity value 148 may also increase. As the values of the intensity data 136 decreases, the output intensity value 148 may also decrease. This allows the VID 152 to remain visible even during changing conditions, such as the HMWD 106 being outside at high noon or being inside a building.

The output intensity value 148 may be determined based on operation of a mathematical function, such as a linear or exponential equation, lookup table, and so forth. For example, the output intensity value 148 may be determined by using data stored in a lookup table. The lookup table may associate particular ambient light values with particular output intensity values 148. By determining the ambient light value indicated in the intensity data 136, the corresponding output intensity value 148 may be determined.

The light from the VID 152 may be obtrusive when it is visible to the bystanders 110 because it is noticeably brighter than the ambient light. The illumination produced by the VID 152 may be deemed unobtrusive when the illuminance of an area on the face of the user 102 as produced by the VID 152 is within a threshold value of the illuminance provided by ambient light. For example, if the ambient light provides 100 lumens per square meter of illumination, the VID 152 may be configured to provide about 100 lumens per square meter of illumination.

In some implementations, the output intensity value 148 may be based at least in part on the specified condition. For example, the specified condition of an urgent incoming message may result in a greater output intensity value 148 than the specified condition of receipt of a low priority message.

At 812, an output color value 150 is determined. For example, the output color value 150 may be determined based on the color data 138 of the ambient light. As described above, by having the VID 152 approximate the color of the ambient light, the presentation of the visual signal may be less obtrusive to bystanders 110.

The output color value 150 may be determined using other information as well. For example, the output color value 150 may be adjusted based on time of day to approximate the daily changes in the color of daylight.

In some implementations, the output color value 150 may be based at least in part on the specified condition. For example, the specified condition of an urgent incoming message may result in an output color value 150 of "red"

rather than the specified condition of receipt of a low priority message that may have an output color value 150 of "ambient light color".

At 814, an illumination pattern is determined. The illumination pattern may specify a particular blink or flash pattern, duration of illumination, ramp times to increase or decrease illumination, and so forth. For example, based on the state data 144 indicating a specific condition of an urgent message, a flash pattern may be presented in which the VID 152 is active for 400 ms and then inactive for 500 ms.

In some implementations, activation and deactivation of the VID 152 may be gradual. For example, when activating the VID 152, the VICM 146 may increase light output from zero to the specified output intensity value 148 over a period of time ranging from between 150 ms to 300 ms. For example, the light output may increase from zero to the specified output intensity value 148 over a period of time that is at least 100 ms long. Likewise, when deactivating the VID 152, the VICM 146 may decrease the light output from the specified output intensity value 148 to zero over a period of time ranging from between 150 ms to 300 ms. By ramping the intensity over a period of time, comfort of the user 102 may be improved. For example, a ramp time of 200 ms may avoid startling the user 102.

At 816, the VID 152 is operated to produce light as specified by one or more of the output intensity value 148, the output color value 150, the illumination pattern, and so forth. For example, the VICM 146 may send electrical signals to the VID 152 that result in the light 606 activating to emit light at a particular color with a particular intensity in a particular pattern. Continuing the example, the VICM 146 may utilize pulse width modulation, provide a particular voltage, and so forth to drive the light 606 to produce the desired illumination.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
a front frame comprising:
  a left brow section and a right brow section joined by a frame bridge;
  a light emitting diode (LED) that emits light from an area on an interior surface of the front frame toward a wearer;
a first hinge connected to the front frame;
a first temple connected to the first hinge, wherein the first temple comprises:
  a microphone;
  an ambient light sensor to generate light sensor data;
  one or more memories storing first computer-executable instructions; and
  one or more hardware processors to execute the first computer-executable instructions to:
    determine, using the light sensor data, an ambient light value;
    determine a state of the microphone;
    determine, based on the ambient light value, an output intensity value; and
    operate the LED at the output intensity value to convey information about the state of the microphone toward the wearer.

2. The head-mounted wearable device of claim 1, wherein the LED is mounted in an upper portion of the right brow section at a position that is to a right of a vertical centerline of the right brow section, the area on the interior surface measuring at least 3 millimeters by at least 1 millimeter.

3. A head-mounted wearable device comprising:
a front frame;
an inner cover of the front frame, wherein the inner cover has an opening;
a visual indicator device mounted proximate to the opening and directing a visual signal from the opening on an interior side of the front frame to convey information toward a wearer;
an ambient light sensor to generate light sensor data;
one or more memories storing first computer-executable instructions; and
one or more hardware processors to execute the first computer-executable instructions to:
  determine state data;
  determine the state data being indicative of a specified condition;
  determine an output intensity value based on the light sensor data; and
  operate the visual indicator device based on the output intensity value to convey the information about the specified condition toward the wearer.

4. The head-mounted wearable device of claim 3, wherein the state data is indicative of one or more of:

operation of a device onboard the head-mounted wearable device, operation of a device in communication with the head-mounted wearable device, an application executing on the head-mounted wearable device, or an application executing on the device that is in communication with the head-mounted wearable device.

5. The head-mounted wearable device of claim 3, wherein the specified condition comprises a microphone on the head-mounted wearable device is in use to acquire audio input data.

6. The head-mounted wearable device of claim 3, wherein the specified condition comprises one or more of:
the head-mounted wearable device is booting up,
a camera is being used by the head-mounted wearable device to acquire image data,
the head-mounted wearable device is in communication with an external server,
the head-mounted wearable device is awaiting a response from the external server,
realtime communication using the head-mounted wearable device is in progress,
an inertial measurement unit is being used by the head-mounted wearable device to acquire motion data, or
a biomedical sensor is being used by the head-mounted wearable device to acquire biomedical data.

7. The head-mounted wearable device of claim 3, further comprising:
the one or more memories storing second computer-executable instructions; and
the one or more hardware processors to execute the second computer-executable instructions to:
determine, using the light sensor data, an ambient light color;
determine an output color value based on the ambient light color; and
operate the visual indicator device based on the output color value.

8. The head-mounted wearable device of claim 3, the visual indicator device comprising one or more of:
a light emitting diode,
an electroluminescent light,
a laser,
a fluorescent light,
an incandescent light,
a liquid crystal element,
a microelectromechanical device,
an electrophoretic element,
a cholesteric element, or
an interferometric element.

9. The head-mounted wearable device of claim 3, wherein the opening is in an upper portion of a right brow section at a position that is to a right of a vertical centerline of the right brow section.

10. The head-mounted wearable device of claim 3, further comprising:
a diffuser element positioned between the visual indicator device and the opening, wherein the diffuser element comprises an optically translucent material.

11. The head-mounted wearable device of claim 3, further comprising:
a light pipe comprising:
a first end proximate to the visual indicator device;
a body extending from the first end through the opening to a second end; and
a diffuser element proximate to the second end, wherein an area of the diffuser element is greater than an area of the opening.

12. The head-mounted wearable device of claim 3, wherein the opening measures between 0.9 and 1.1 millimeters tall and between 2.5 and 3.2 millimeters wide.

13. The head-mounted wearable device of claim 3, wherein the output intensity value produces a first illuminance value of a first area of the wearer of the head-mounted wearable device that is within a threshold value of a second illuminance value of the first area that is produced by ambient light.

14. The head-mounted wearable device of claim 3, further comprising:
a touch sensor arranged on a same side of the head-mounted wearable device as the opening; and
the one or more hardware processors to execute the first computer-executable instructions to operate the visual indicator device further comprising instructions to:
increase light output from zero to the output intensity value over a period of time that is at least 100 milliseconds long.

15. The head-mounted wearable device of claim 3, further comprising:
the one or more memories storing second computer-executable instructions; and
the one or more hardware processors to execute the second computer-executable instructions to:
determine an output color value based on the specified condition; and
the one or more hardware processors to execute the first computer-executable instructions to operate the visual indicator device further comprising instructions to:
operate the visual indicator device to produce light of a color specified by the output color value.

16. A method performed by a hardware processor comprising:
determining state data indicative of operation of a device on a head-mounted wearable device or a device connected to the head-mounted wearable device, wherein the operation of the device on the head-mounted wearable device or the device connected to the head-mounted wearable device comprises one or more of:
the head-mounted wearable device is booting up,
use of a microphone of the head-mounted wearable device,
use of a camera of the head-mounted wearable device,
use of a position sensor of the head-mounted wearable device,
use of a touch sensor of the head-mounted wearable device,
use of a communication interface to communicate with a server external to the head-mounted wearable device,
use of an inertial measurement unit of the head-mounted wearable device, or
use of a biomedical sensor of the head-mounted wearable device;
determining an ambient light value;
determining an output intensity value based on the ambient light value; and
operating, based on the output intensity value, a visual indicator device that emits light from an area located on an interior surface of the head-mounted wearable device, the light providing a visual signal to convey information about the state data to a wearer of the head-mounted wearable device.

17. The method of claim 16, the determining the output intensity value comprising:
- accessing a lookup table that associates a particular ambient light value with a particular output intensity value; and
- retrieving, from the lookup table, the output intensity value that is associated with the ambient light value.

18. The method of claim 16, further comprising:
- determining, based on the operation, a first output color value; and
- setting a color of the light emitted by the visual indicator device based on the first output color value.

19. The method of claim 16, further comprising:
- determining time data using a clock;
- determining, based on the time data, a first output color value; and
- setting a color of the light emitted by the visual indicator device based on the first output color value.

20. A head-mounted wearable device comprising:
- a front frame;
- an inner cover of the front frame, wherein the inner cover has an opening;
- a visual indicator device mounted proximate to the opening and directing a visual signal to convey information toward a wearer;
- one or more memories storing first computer-executable instructions; and
- one or more hardware processors to execute the first computer-executable instructions to:
  - determine state data indicative of a specified condition;
  - determine an output intensity value based on light sensor data; and
  - operate the visual indicator device based on the output intensity value.

21. The head-mounted wearable device of claim 20, further comprising:
- the one or more memories storing second computer-executable instructions; and
- the one or more hardware processors to execute the second computer-executable instructions to:
  - determine an output color value based on the specified condition; and
- the one or more hardware processors to execute the first computer-executable instructions to operate the visual indicator device further comprising instructions to:
  - operate the visual indicator device to produce light of a color specified by the output color value.

* * * * *